(12) United States Patent
Welicki et al.

(10) Patent No.: US 8,949,785 B2
(45) Date of Patent: Feb. 3, 2015

(54) CUSTOM COMPOUND TYPES IN DECLARATIVE PROGRAMS

(75) Inventors: Leon E. Welicki, Issaquah, WA (US); John Anthony Taylor, Bellevue, WA (US); Clark Roberts, Seattle, WA (US); Kenneth David Wolf, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 445 days.

(21) Appl. No.: 13/327,674

(22) Filed: Dec. 15, 2011

(65) Prior Publication Data

US 2013/0159970 A1    Jun. 20, 2013

(51) Int. Cl.
*G06F 9/44*    (2006.01)

(52) U.S. Cl.
USPC ............................ 717/117; 717/112; 717/114

(58) Field of Classification Search
None
See application file for complete search history.

(56) References Cited

U.S. PATENT DOCUMENTS

| | | | |
|---|---|---|---|
| 6,704,736 B1 * | 3/2004 | Rys et al. ............................... | 1/1 |
| 6,959,416 B2 * | 10/2005 | Manning et al. ............... | 715/227 |
| 7,496,892 B2 * | 2/2009 | Nuss ............................... | 717/114 |
| 7,836,428 B2 * | 11/2010 | Mitchell et al. ................ | 717/117 |
| 7,970,746 B2 * | 6/2011 | Seshadri et al. ............... | 707/694 |
| 8,418,132 B2 * | 4/2013 | Williams et al. ............... | 717/111 |
| 2002/0143521 A1 * | 10/2002 | Call .................................. | 704/1 |
| 2005/0097514 A1 * | 5/2005 | Nuss ............................... | 717/114 |
| 2005/0203958 A1 * | 9/2005 | Mitchell et al. ............. | 707/104.1 |
| 2006/0248112 A1 * | 11/2006 | Williams et al. ............... | 707/102 |
| 2009/0113379 A1 | 4/2009 | Sedukhin et al. | |
| 2009/0222794 A1 * | 9/2009 | Pinto et al. ..................... | 717/116 |
| 2009/0222827 A1 * | 9/2009 | Pinto et al. ..................... | 718/102 |
| 2010/0241990 A1 * | 9/2010 | Gabriel et al. ................ | 715/810 |
| 2010/0299300 A1 * | 11/2010 | Wolf et al. ........................ | 706/46 |
| 2013/0159970 A1 * | 6/2013 | Welicki et al. ................. | 717/117 |

OTHER PUBLICATIONS

Marriott, et al., "The Design of the Zinc Modelling Language", In Journal of Constraints, vol. 13, Issue 3, Sep. 2008, 40 pages.
Kessenich, et al., "The OpenGL Shading Language", Published on: Sep. 7, 2011, Available at: http://www.opengl.org/registry/doc/GLSLangSpec.Full.1.20.8.pdf.

(Continued)

*Primary Examiner* — Don Wong
*Assistant Examiner* — Marina Lee
(74) *Attorney, Agent, or Firm* — Ben Tabor; Brian Haslam; Micky Minhas

(57) ABSTRACT

The present invention extends to methods, systems, and computer program products for creating and manipulating custom compound data types in declarative programs. The present invention allows a developer to create and use custom compound data types without requiring the custom type to be specifically defined (e.g. via registering a custom assembly) in the underlying framework. This is accomplished by providing a data container that is configurable to represent virtually any combination of primitive or compound types defined within the framework. The present invention also provides a declarative model for interacting with data containers representing custom compound data types. This declarative model employs a path-based syntax (or other type of syntax) for accessing the elements of a custom compound data type. Multiple paths can be defined within a single unit of developer input so that multiple elements of a custom data type can be manipulated by the single unit of input.

9 Claims, 9 Drawing Sheets

(56) References Cited

OTHER PUBLICATIONS

Hamfelt, et al., "Declarative Logic Programming with Primitive Recursive Relations on Lists", In Proceedings of Joint International Conference and Symposium on Logic Programming, 1996, 14 pages.
Abadi, et al., "Faithful Ideal Models for Recursive Polymorphic Types", In Proceedings of Fourth Annual Symposium on Logic in Computer Science, Jun. 5-8, 1989, pp. 216-225.
"Windows Azure Tables: Introducing Upsert and Query Projection", Retrieved on: Nov. 4, 2011, Available at: http://blogs.msdn.com/b/windowsazurestorage/archive/2011/09/15/windows-azure-tables-introducing-upsert-and-query-projection.aspx.

* cited by examiner

US 8,949,785 B2

CUSTOM COMPOUND TYPES IN DECLARATIVE PROGRAMS

CROSS-REFERENCE TO RELATED APPLICATIONS

Not Applicable.

BACKGROUND

Background and Relevant Art

Declarative languages are often used to define workflows which represent processes. These declarative languages define what a process does rather than how it does it. For example, a workflow may represent a process for approving a mortgage. The process may include a first person receiving an applicant's information and storing the information in one or more data structures representing an application. The application can then be sent to a second person who performs an initial screening of the application and determines where to route the application for final processing. A third person may then receive the application and either approve or reject it thus causing a corresponding notice to be sent to the applicant.

Such a workflow can use a declarative language to specify which data structures are used in the process and which entities use the data structures. For example, different data structures (e.g. types) may be used by the different entities involved in the process. Because declarative languages describe what a process does rather than explicitly defining how it does it, the workflow framework must define the underlying types used by the process.

For example, the developer of the mortgage workflow would generally be limited to the types of data structures defined by the workflow framework on which the mortgage workflow is to be executed. Such types may include primitive data types (e.g. CHAR, INT, STRING, etc.) as well as compound data structures such as a person type that includes a first name, last name, social security number, address, etc. If the developer desired to use a compound person type, he would have to use whatever person type the underlying framework defined.

In some workflow systems, the developer can manipulate the underlying type system to specifically add a custom compound data type (e.g. via registering a custom assembly). In this case, while the custom type can potentially be accessed, it is not well-known to the workflow framework, is unverifiable, and cannot be adequately included in generic analysis of the mortgage workflow.

Additionally, developers may often desire to use custom recursive compound data structures. Recursive refers to the inclusion of one or more other compound data structures within a compound data structure (e.g. an array having an element that is a compound data structure). Developers may also desire to use custom polymorphic compound data structures. Polymorphic refers to the ability to store different types of data structures within the same compound data structure (e.g. an array that contains elements of different types).

However, because current workflow frameworks do not allow the developer to define custom data structures (unless the developer resorts to manipulating the underlying type system via assemblies or the like), developers are forced to implement recursion and polymorphism in other ways which entail much complexity for the developer. Some examples of this added complexity that the developer must address include the explicit type coercion of primitives (e.g. when binding a first variable or argument of a workflow to a second variable or argument of the workflow), and the direct handling of polymorphism between primitives and data structures containing the primitives (e.g. when defining a compound data structure that includes another compound data structure storing primitives) which both lead to extra verbosity in the declarative language code when creating or consuming such objects. Further, such use can also require that the developer write complex control flow logic to define the recursive nature of a data structure.

BRIEF SUMMARY

The present invention extends to methods, systems, and computer program products for creating and manipulating custom compound data types in declarative programs. The present invention allows a developer to create and use custom compound data types without requiring the custom type to be specifically defined (e.g. via registering a custom assembly) in the underlying framework. This is accomplished by providing a data container that can be configured to represent virtually any combination of primitive or compound data types defined within the underlying framework.

The present invention also provides a declarative model for interacting with data containers representing custom compound data types. This declarative model employs a path-based syntax (or other type of syntax such as a query-based syntax) for accessing the elements of a custom compound data type. The path-based syntax can be used to read or write elements within a custom data type, as well as to copy elements from one custom data type to another custom data type. Multiple paths can be defined within a single unit of developer input so that multiple elements of a custom data type can be manipulated by the single unit of developer input.

In one embodiment, a declarative language is used to create a compound data structure within a workflow framework. Developer input is received at the workflow framework. The developer input defines multiple paths and a value for each path in the declarative language. The multiple paths and corresponding values represent a compound data structure that the developer desires to create within a workflow.

The workflow framework interprets each path to create the compound data structure by: (1) determining a type of element to create for the path; (2) creating the determined element in the compound data structure for each path; and (3) for each path, assigning the corresponding value to the element created for the path.

In another embodiment, a declarative language is used to read values of a compound data structure using a declarative language. Developer input is received at the workflow framework. The developer input defines multiple paths and a workflow program location for each path. Each path defines an element of a compound data structure whose value is to be bound to the corresponding workflow program location.

For each path, the workflow framework: (1) determines which element of the compound data structure the path refers to and reads the value of the determined element; and (2) assigns the value of the element referred to by each path to the corresponding workflow program location, including automatically performing a type coercion on the value.

In another embodiment, a declarative language is used to copy values of a compound data structure to another compound data structure within a workflow framework. Developer input is received at the workflow framework. The developer input defines multiple paths to elements of a first compound data structure and corresponding multiple paths to elements of a second compound data structure. For each path to an element of the first compound data structure, the workflow framework: (1) determines which element of the first compound data structure the path refers to and reads the value of the determined element; and (2) reads the value of the element of the first compound data structure into an element of the second compound data structure.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
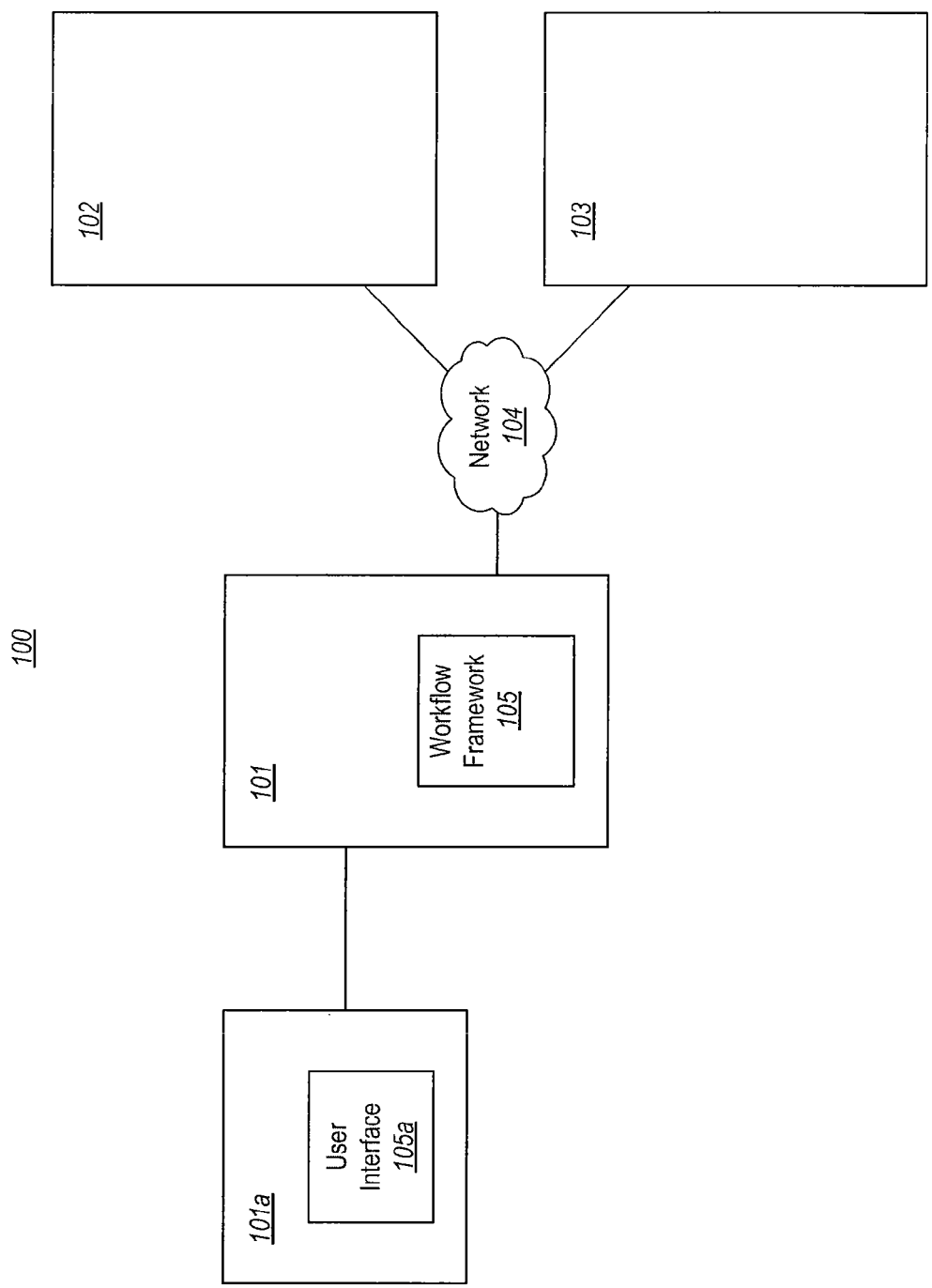
FIG. 1 illustrates an example computer architecture that facilitates creating and manipulating custom compound types in declarative programs.

The present invention extends to methods, systems, and computer program products for creating and manipulating custom compound data types in declarative programs. The present invention allows a developer to create and use custom compound data types without requiring the custom type to be specifically defined (e.g. via registering a custom assembly) in the underlying framework. This is accomplished by providing a data container that can be configured to represent virtually any combination of primitive or compound data types defined within the underlying framework.

The present invention also provides a declarative model for interacting with data containers representing custom compound data types. This declarative model employs a path-based syntax (or other type of syntax such as a query-based syntax) for accessing the elements of a custom compound data type. The path-based syntax can be used to read or write elements within a custom data type, as well as to copy elements from one custom data type to another custom data type. Multiple paths can be defined within a single unit of developer input so that multiple elements of a custom data type can be manipulated by the single unit of developer input.

In one embodiment, a declarative language is used to create a compound data structure within a workflow framework. Developer input is received at the workflow framework. The developer input defines multiple paths and a value for each path in the declarative language. The multiple paths and corresponding values represent a compound data structure that the developer desires to create within a workflow.

The workflow framework interprets each path to create the compound data structure by: (1) determining a type of element to create for the path; (2) creating the determined element in the compound data structure for each path; and (3) for each path, assigning the corresponding value to the element created for the path.

In another embodiment, a declarative language is used to read values of a compound data structure using a declarative language. Developer input is received at the workflow framework. The developer input defines multiple paths and a workflow program location for each path. Each path defines an element of a compound data structure whose value is to be bound to the corresponding workflow program location.

For each path, the workflow framework: (1) determines which element of the compound data structure the path refers to and reads the value of the determined element; and (2) assigns the value of the element referred to by each path to the corresponding workflow program location, including automatically performing a type coercion on the value.

In another embodiment, a declarative language is used to copy values of a compound data structure to another compound data structure within a workflow framework. Developer input is received at the workflow framework. The developer input defines multiple paths to elements of a first compound data structure and corresponding multiple paths to elements of a second compound data structure. For each path to an element of the first compound data structure, the workflow framework: (1) determines which element of the first compound data structure the path refers to and reads the value of the determined element; and (2) reads the value of the element of the first compound data structure into an element of the second compound data structure.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media.

Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or store desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates creating and manipulating custom compound types in declarative programs. Referring to FIG. 1, computer architecture 100 includes a number of computer systems including computer systems 101, 102, and 103. Each of the depicted computer systems is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

FIG. 1 shows that computer system 101 includes workflow framework 105. Computer system 101 also includes display 101a which displays a user interface 105a for interacting with workflow framework 105. For example, user interface 105a can comprise a design surface of an integrated development environment for developing workflows within workflow framework 105. User interface 105a, however, can be any user interface for receiving developer input for creating and manipulating compound data types within workflow framework 105. A developer provides input to user interface 105a to create and manipulate custom compound types as is further described below.

Although workflow framework 105 is shown only on computer system 101, workflow framework 105 can be installed on any of the depicted computer systems. For example, a workflow can be defined by a developer on computer system 101 and then executed on another computer system where workflow framework is installed. Further, each of the computer systems of FIG. 1 can represent any number of physical computers or computer resources. For example, computer system 101 can represent a desktop computer, a server and multiple client computers, or any other configuration of computer resources.

Additionally, a computer system can represent a cloud of computer resources. For example, workflow framework 105 can be stored within a cloud and made available to any computer system connected to the cloud. Accordingly, the invention is not limited to any particular location of workflow framework 105 or any particular means for accessing workflow framework 105.

Figure 2:
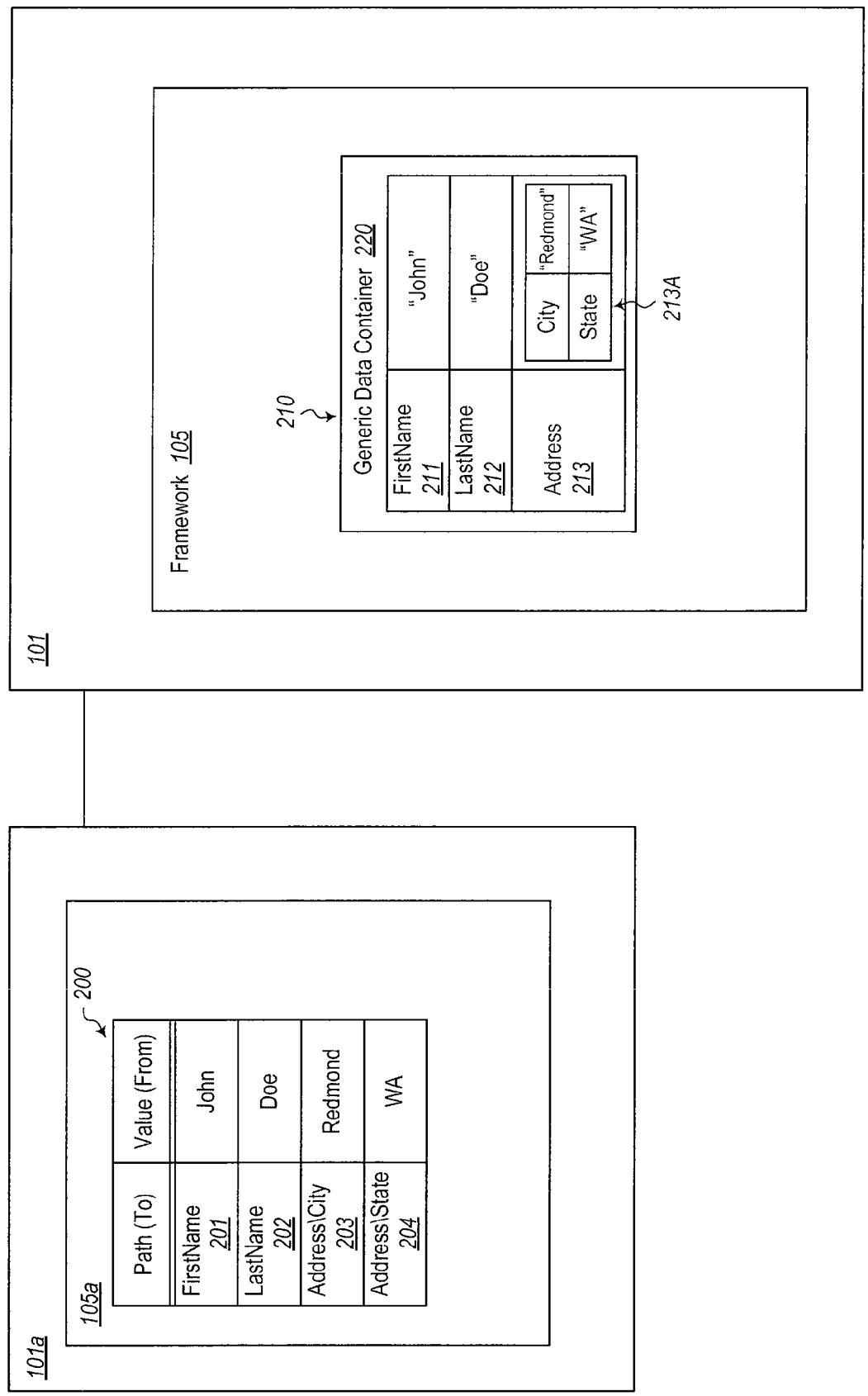
FIG. 2 illustrates an exemplary view of a user interface which includes developer input for creating a custom compound data type.

FIG. 2 illustrates an exemplary view of user interface 105a which includes developer input 200 for creating a custom compound data type. Developer input 200 is structured in a table format and comprises a number of paths which define elements for the custom compound data type and values for each element. Specifically, the table format includes a first column which includes the paths and a second column which includes the values for elements created from the paths.

In a particular embodiment, the table format used for developer input 200 can include a header row which defines the type of data in each column. For example, in developer input 200, the header for the first column is "Path (to)" indicating that the data in the first column comprises paths to elements of a compound data structure (whether already created or to be created as described below). Also, the header for the second column is "Value (from)" indicating that the data in the second column comprises values to be assigned to the elements identified by the corresponding paths. These values can be explicit values (i.e. the actual value to be assigned), or program location values (i.e. names of variables in a declarative program) from which the value is to be obtained.

Similar headers can be used when the developer input represents other types of data (such as is shown in FIGS. 3-6). For example, a header of "Path (from)" can indicate that the corresponding columns include paths to elements from which values are to be read. Likewise, a header of "Value (to)" can indicate that the corresponding columns include program location values (i.e. names of variables in a declarative program) to which values (e.g. values in elements defined by paths) are to be written.

In other words, a developer can include headers in developer input to specify the type of the data in the developer input. Of course, the invention is not limited to using headers to identify the type of data, or to any specific headers. Any appropriate means for identifying the type of data may be used within the present invention.

Returning to FIG. 2, path 201 defines a path of FirstName, path 202 defines a path of LastName, path 203 defines a path of Address\City, and path 204 defines a path of Address\State. As can be seen, a path can consist of one element (e.g. First-Name), two elements (e.g. Address\City), or any other number of elements. The path syntax shown in this example separates each element by a backward slash ("\"); however, a path syntax could employ any symbol to delimit elements of a path.

Although this specification refers to a path-based syntax, other types of syntaxes, such as a query-based syntax, could also be used. If a query-based syntax were used in place of a path-based syntax, paths 201-204 of developer input 200 would each be in the form of a query rather than a path. As described below, workflow framework could be configured to parse developer input 200 to generate a custom compound type in a similar manner regardless of the type of syntax used for the input.

When a developer provides input 200 in this format, workflow framework 105 parses the input to generate a custom compound type. This is done by creating and organizing the appropriate types within a data container. Custom compound type 210 illustrates the structure of the custom compound type that is generated from developer input 200. Custom compound type 210 is a recursive (because it contains a nested data type (e.g. the value of the Address element)) and polymorphic (because it contains values of different types) structure and is contained within generic data container 220. Data container 220 is understood by workflow framework 105 to contain custom arrangements of data types. Workflow framework 105 does not need to know the exact structure of custom compound type 210 because the details of the structure are abstracted by data container 220.

Workflow framework 105 receives path 201 and generates element 211 which is the first element in the structure and assigns the value of "John" to element 211. Similarly, workflow framework 105 receives path 202 and generates element 212 as the second element with a value of "Doe."

When evaluating paths 203 and 204, workflow framework 105 determines that paths 203 and 204 refer to elements that should be created within a nested data type. In other words, workflow framework 105 determines that a compound data type, Address, should be created and nested within custom compound type 210. This nested compound data type should have two elements: "City" and "State." Accordingly, workflow framework 105 creates a compound data type 213a for the value of element 213. Compound data type 213a is a structure with two elements: "City" and "State" each having the corresponding value provided in developer input 200.

In this manner, a developer can provide developer input 200 in the form of multiple path/value combinations, and framework 105 will generate a custom compound data type to match the desired intent of the developer. Notably, custom data type 210 does not conform to any specific predefined compound data type within workflow framework 105. Data container 220 abstracts the specific structure and types within a compound data type thereby allowing the developer to create virtually any custom data type without the burdensome requirement of having to first define and register the custom data type with framework 105.

Figure 3:
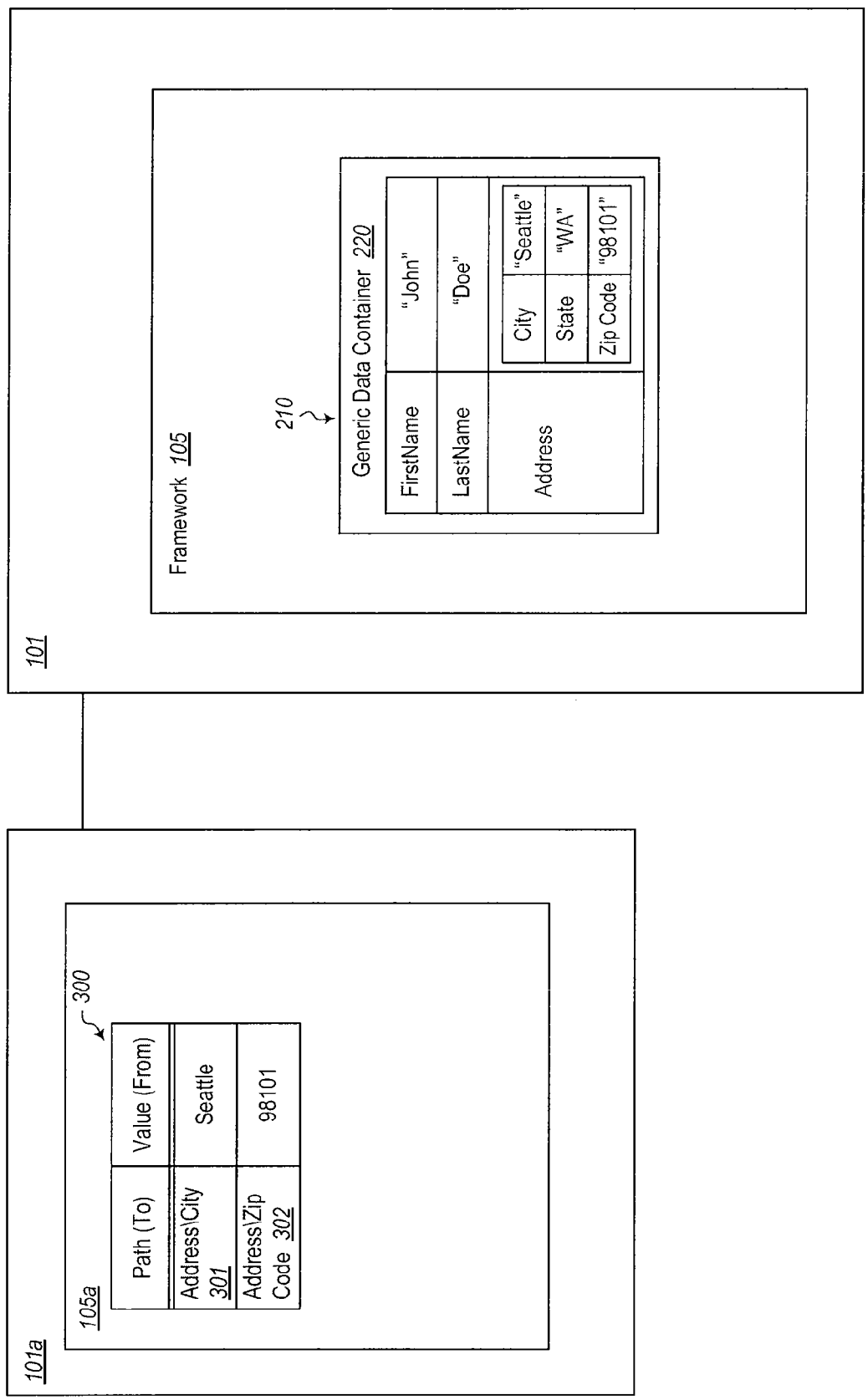
FIG. 3 illustrates how a custom data type is changed in response to developer input.

In addition to creating a custom compound data type from developer input 200, the same path-based semantics can be used to modify an existing custom data type. These modifications include updating a value of an existing element, or creating a new element within the existing custom data type. For example, FIG. 3 illustrates the changes made to custom data type 210 when developer input 300 is received.

Developer input 300 includes a path 301 of Address\City with a value of "Seattle." When framework 105 parses path 301, it will determine that path 301 refers to an existing element in custom data type 210 and will update the value of the element with the specified value of "Seattle." Developer input 300 also includes path 302 of Address\Zip Code with a value of "98101." When framework 105 parses path 302, it will determine that path 302 refers to an element that does not yet exist in custom data type 210. Accordingly, framework 105 will create a third element within embedded compound data type 213a to hold the value of John Doe's Zip Code.

The path-based semantics allow a developer to specify a path and a value without being concerned whether an element defined by the path has already been created. The framework will create an element if no element has been created and assign the value to it, or if the element has been created, the framework will update the value. Accordingly, framework 105 allows a developer to provide path statements for both creating an element and modifying an element within the same unit of input, and without having to specify the specific intent (i.e. create or modify) of each path.

Figure 4:
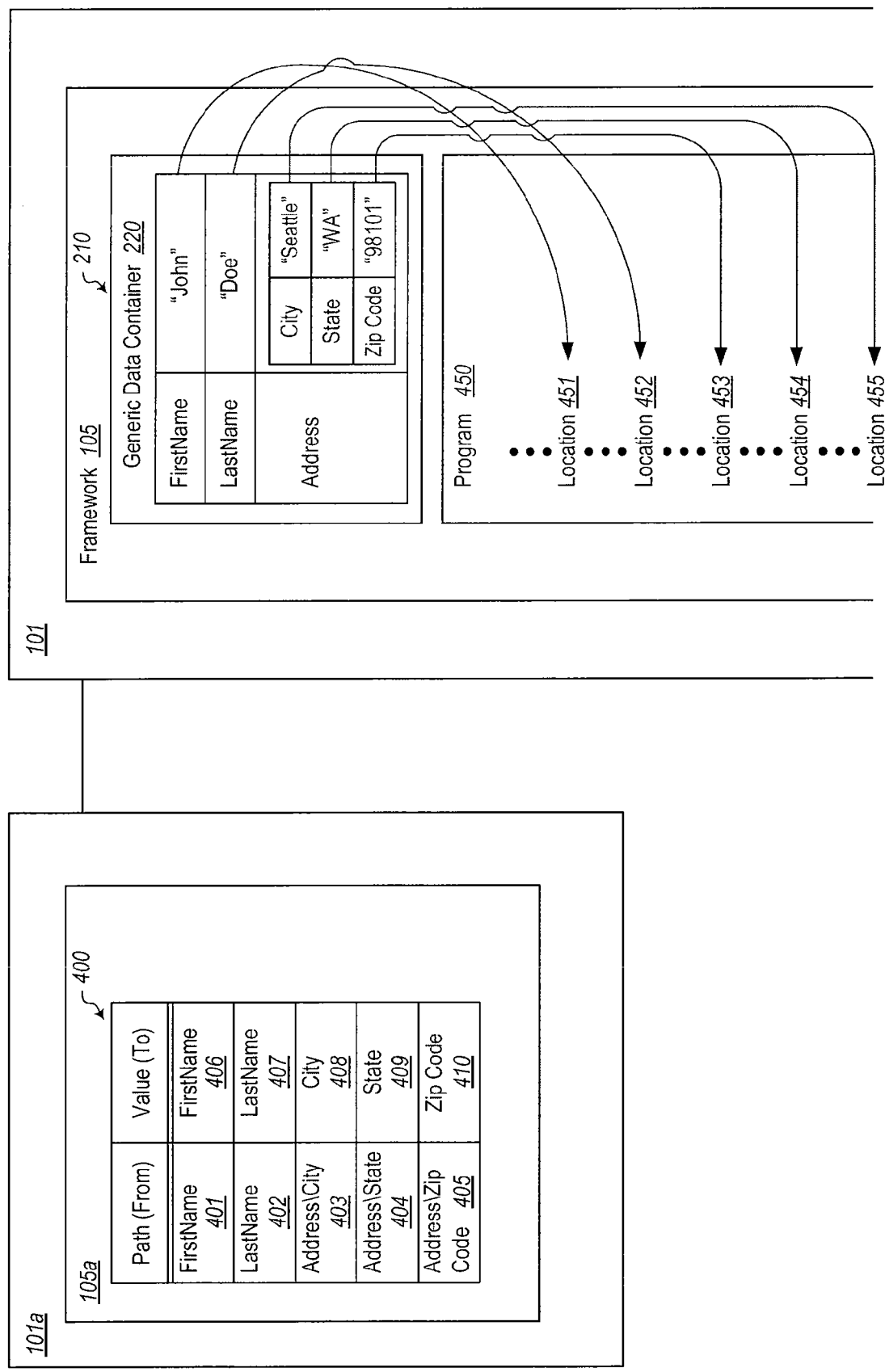
FIG. 4 illustrates how values can be read from a custom data type into program locations.

FIG. 4 illustrates how values can be read from custom data type 210 into program locations (e.g. variables of a program). As shown, the developer has provided developer input 400 into user interface 105a. Developer input 400 includes paths 401-405 and specifies values of program locations (i.e. names of variables) 451-455.

Specifically, value 406 is specified as FirstName and represents a program location (i.e. variable) in declarative program 450. Similarly, values 407-410 are specified as Last-Name, City, State, and ZipCode respectively, and each represent a program location (i.e. variable) in declarative program 450. Although in developer input 400, the names of the values are generally the same as the names of the paths (e.g. FirstName 406~FirstName 401), this is not a requirement. For example, if the desired program location to which the value of path 401 is to be bound is a variable named foo, value 406 would be foo rather than FirstName.

When framework 105 receives developer input 400, it parses the input to determine that the specified values of custom data type 210 are to be read into the specified program locations in developer input 400. In FIG. 4, framework 105 is shown as parsing path 401 to determine that the value of the first element (FirstName) of custom data type 210 is to be read into program location 451 (i.e. where the variable named FirstName is located within declarative program 450).

Framework 105 parses the remaining paths in developer input 400 to determine that the value of the second element (LastName), and the value of the first, second, and third elements of the nested data type within the third element (City, State, Zip Code) are to be read into program locations 452-455 as shown by the arrows in FIG. 4. As can be seen, framework 105, parses each path to determine which element of custom data type 210 is referred to by the path, and assigns the value of the determined element to the specified program location.

Figure 5:
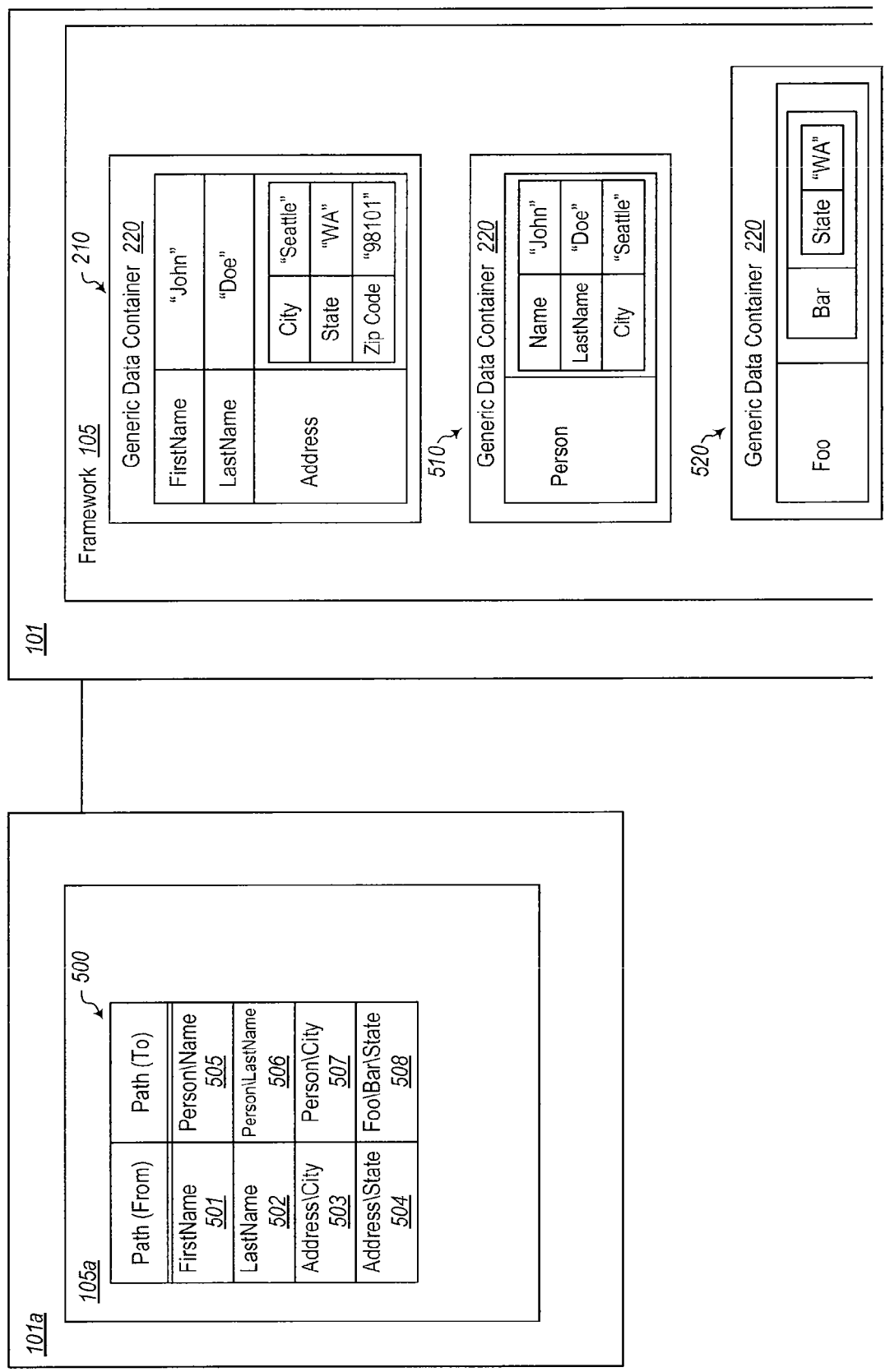
FIG. 5 illustrates how a developer can copy values from one custom data type to one or more other custom data types.

FIG. 5 illustrates how a developer can copy values from one custom data type to one or more other custom data types. As shown, the developer has provided developer input 500 which specifies two sets of paths. The first set (501-504) specifies paths to elements of custom data type 210. The second set (505-508) specifies paths to elements of two other custom data types 510, 520. As described with respect to FIGS. 2 and 3, custom data types 510 and 520 (as well as the elements within custom data types 510 and 520) could be created or modified in response to developer input 500 depending on whether the custom data types or elements were already created.

It is noted that any number of the values from a custom data type can be copied. For example, as shown in FIG. 5, four of the five values are copied (ZipCode is not copied). Additionally, a value from one custom data type can be copied to any element of another custom data type. For example, paths 505 and 506 could be swapped in developer input 500 thus causing the value of the FirstName element in custom data type 210 to be copied into the LastName element of custom data type 501, and the value of the LastName element in custom data type 210 to be copied into the Name element of custom data type 501.

When framework 105 parses developer input 500, it determines that two sets of paths have been provided thus indicating that values from one custom data type are to be copied into values of one or more other custom data types. In the example of FIG. 5, the values of the FirstName, LastName, and Address\City elements are copied into a nested structure within a first element of a custom data type 510. The first element of custom data type 510 is given a name of Person and a value comprising the nested structure. In contrast, the value of the Address\State element is copied into a doubly nested data type. Specifically, an element, named Foo, of custom data type 520 has a value comprised of a nested structure having a first element named Bar whose value is comprised of another nested structure. This other nested structure has a first element named State with a value of "WA."

Figure 6:
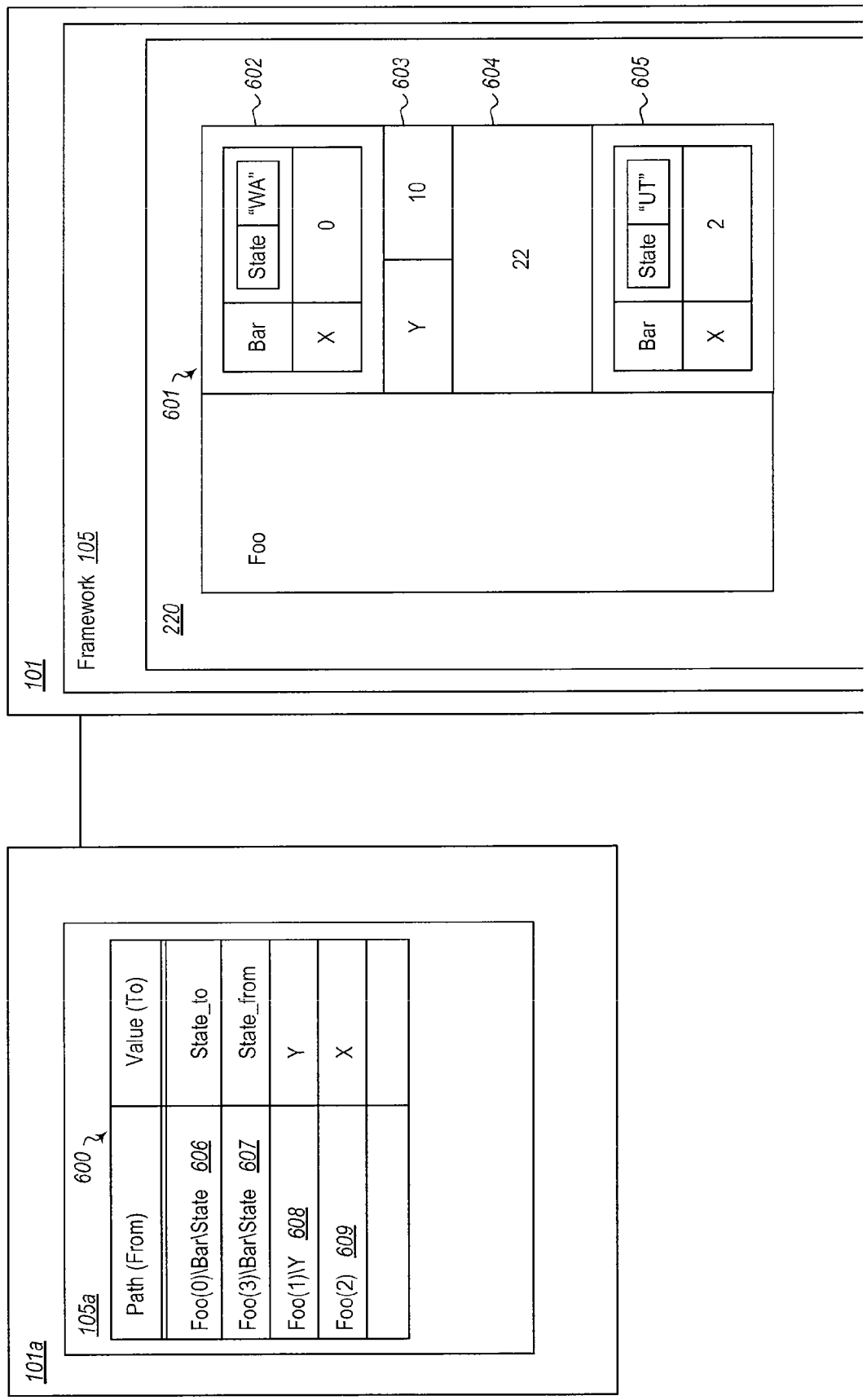
FIG. 6 illustrates an exemplary custom data type and developer input for accessing elements of the custom data type.

FIG. 6 illustrates another custom data type 601. Custom data type 601 is similar to custom data type 502 but has additional elements to better illustrate when indexes are used to refer to elements of a nested structure. Custom data type 601 includes a first element named Foo that has a value comprised of an array of elements 602-605. Developer input 600 includes four paths each referencing an element in custom data type 601. Because the value of Foo is a nested structure (an array), paths to the elements within the Foo structure include an index to the desired element of the array.

For example, path 606 refers to the State element nested in the Bar element in element 602 of the Foo structure. Accordingly, path 606 references Foo(0)\Bar\State. Path 607 similarly references the State element nested in the Bar element in element 605 of the Foo structure. Path 608 references the Y element in element 603 of the Foo structure. Finally, path 609 references the value of element 604 which is an INT value. Accordingly, the value of element 604 can be referenced with the path Foo(2). Developer input 600 shows that the referenced values are being dynamically copied into program locations (as defined by the Value (to) header). However, similar path semantics would be used to create or update values of elements in custom compound data type 601 or to copy the values of elements to another custom compound data type.

As part of copying values from a custom data type to a program location or to another custom data type, framework 105 performs automatic type coercion on the value. For example, referring again to FIG. 4, custom compound data type 210 may store the value of the Zip Code element as an INT. However, when the value is read into program location 405, framework 105 may determine that the variable zip 410 requires a string. Framework 105 would then automatically coerce the INT type to a string type to match the type of the variable zip. In this manner, the developer is relieved of the burden of performing type coercion when using values from custom compound data types.

Figure 7:
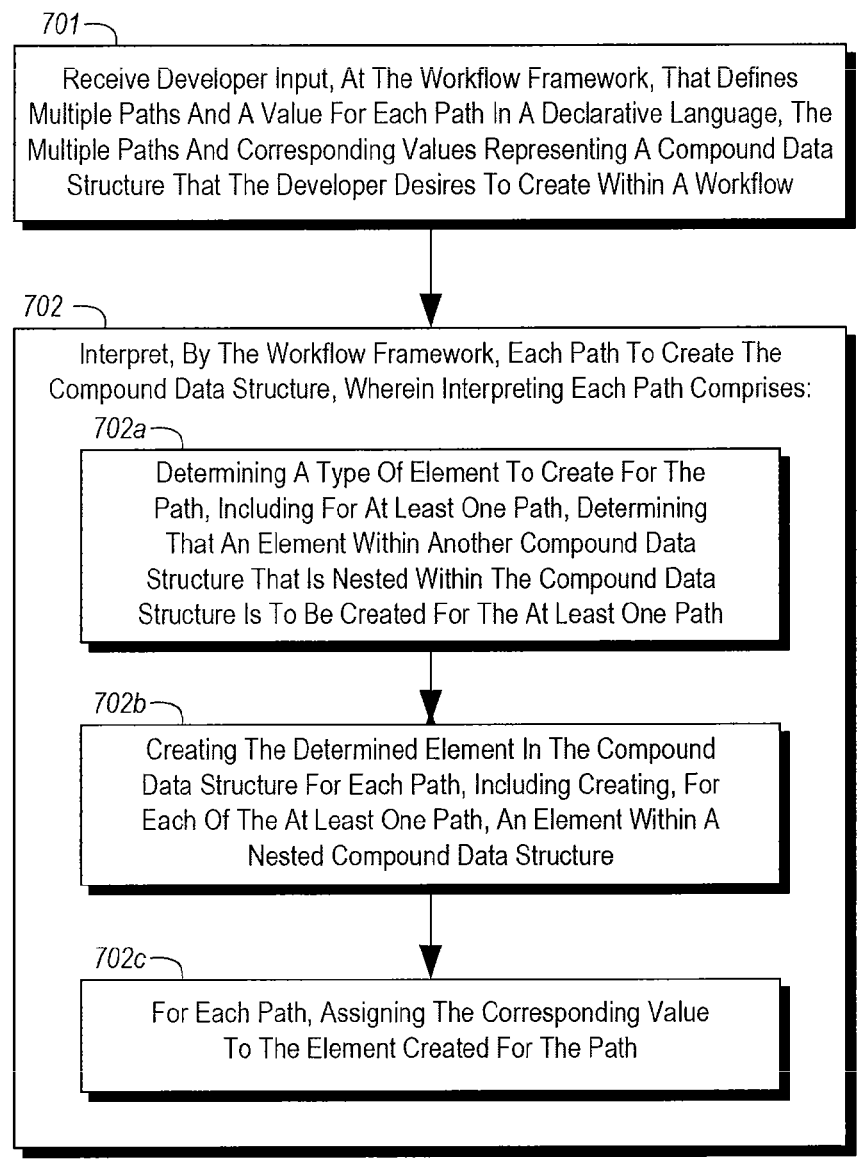
FIG. 7 illustrates a flow chart of an example method for creating a compound data structure using a declarative language.

FIG. 7 illustrates a flow chart of an example method 700 for creating a compound data structure using a declarative language. Method 700 will be described with respect to FIG. 2.

Method 700 includes an act 701 of receiving developer input, at the workflow framework, that defines multiple paths and a value for each path in a declarative language, the multiple paths and corresponding values representing a compound data structure that the developer desires to create within a workflow. For example, framework 105 can receive developer input 200.

Method 700 includes an act 702 of interpreting, by the workflow framework, each path to create the compound data structure. For example, framework 105 can interpret paths 201-204 in developer input 200 to create custom compound data type 210.

Act 702 includes an act 702a of determining a type of element to create for the path. For example, framework 105 can determine that path 203 indicates that compound data type 210 is to include an Address element having a value that is a nested compound data structure (e.g. a structure) having an element named City. Similarly, framework 105 can determine that path 204 indicates that the nested compound data structure should also include an element named State. Framework 105 can also determine that paths 201 and 202 indicate that compound data type 210 is to include a FirstName and LastName element.

Act 702 includes an act 702b of creating the determined element in the compound data structure for each path. For example, framework 105 can create custom data type 210 with an Address element that has a value that is the nested compound data structure that includes a City and a State element. Framework 105 can also create a FirstName and LastName element within custom data type 210.

Act 702 includes an act 702c of, for each path, assigning the corresponding value to the element created for the path. For example, framework 105 can assign the corresponding value to each created element in custom data type 210.

Figure 8:
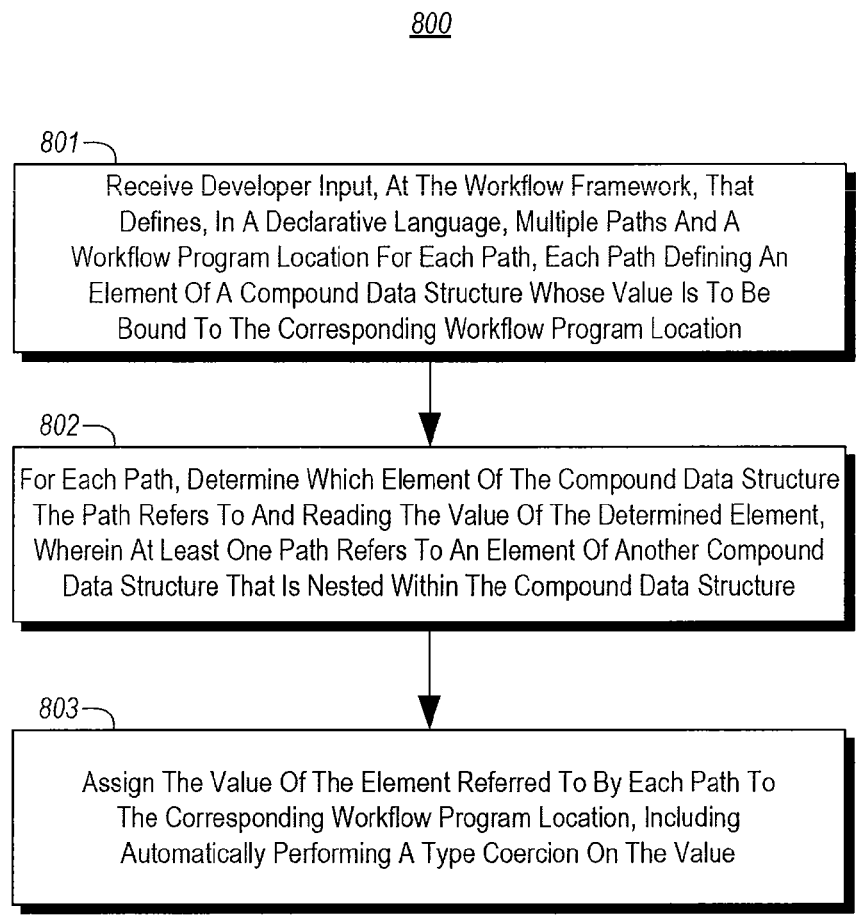
FIG. 8 illustrates a flow chart of an example method for reading values of a compound data structure using a declarative language.

FIG. 8 illustrates a flow chart of an example method 800 for reading values of a compound data structure using a declarative language. Method 800 will be described with respect to FIG. 4.

Method 800 includes an act 801 of receiving developer input, at a workflow framework, that defines, in a declarative language, multiple paths and a workflow program location for each path, each path defining an element of a compound data structure whose value is to be bound to the corresponding workflow program location. For example, framework 105 can receive developer input 400 which defines paths 401-405 and corresponding program locations 406-410.

Method 800 includes an act 802 of, for each path, determining which element of the compound data structure the path refers to and reading the value of the determined element. For example, framework 105 can determine that path 403 refers to the City element of the compound data structure nested within the Address element.

Method 800 includes an act 803 of assigning the value of the element referred to by each path to the corresponding workflow program location, including automatically performing a type coercion on the value. For example, framework 105 can assign the value "98101" to program location 453 and perform any necessary type coercion on the value. This type coercion can include, for example, determining whether "98101" is a string, and integer, or a double.

Figure 9:
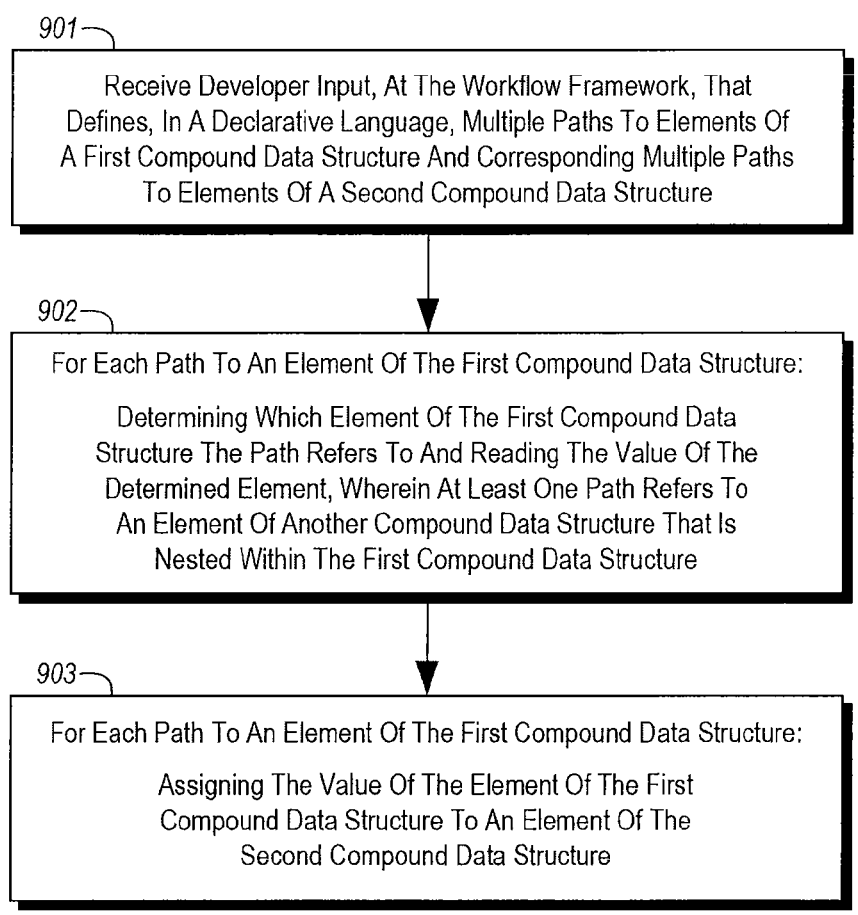
FIG. 9 illustrates a flow chart of an example method for copying values of a compound data structure to another compound data structure using a declarative language.

FIG. 9 illustrates a flow chart of an example method 900 for copying values of a compound data structure to another compound data structure using a declarative language. Method 900 will be described with respect to FIG. 5.

Method 900 includes an act 901 of receiving developer input, at a workflow framework, that defines, in a declarative language, multiple paths to elements of a first compound data structure and corresponding multiple paths to elements of a second compound data structure. For example, framework 105 can receive developer input 500 that includes paths 501-504 and corresponding paths 505-508.

Method 900 includes an act 902 of, for each path to an element of the first compound data structure, determining which element of the first compound data structure the path refers to and reading the value of the determined element. For example, framework 105 can determine that path 503 refers to the City element of the compound data structure nested within the Address element of custom data type 210 and read the value "Redmond" from the element.

Method 900 includes an act 903 of, for each path to an element of the first compound data structure, assigning the value of the element of the first compound data structure to an element of the second compound data structure. For example, framework 105 can assign the value "Redmond" to a City element within a compound data structure that is nested within a Person element of custom data type 501.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including a workflow framework, a method for creating a compound data structure using a declarative language, the method comprising:
    receiving developer input in a declarative language, at the workflow framework, that defines multiple paths and a value for each path, the multiple paths and corresponding values representing a compound data structure that the developer desires to create within a workflow, each path of the multiple paths corresponding to a path to the value for the each path in the resulting created compound data structure and each value for the each path corresponding to a value from the each path in the resulting created compound data structure;
    interpreting each path, by the workflow framework, to create the compound data structure, wherein interpreting each path comprises:
        determining a type of element to create for the each path;
        creating the determined element in the compound data structure for each path; and
        for each path, assigning the corresponding value to the element created for the path.

2. The method of claim 1, wherein the paths and corresponding values in the received developer input are arranged in a table format.

3. The method of claim 1, wherein determining a type of element to create for the path comprises:
    for at least one path, determining that an element within another compound data structure that is nested within the compound data structure is to be created for the at least one path;
    and wherein creating the determined element in the compound data structure for each path comprises:
    creating, for each of the at least one path, an element within a nested compound data structure.

4. The method of claim 3, wherein the nested compound data structure is a compound object and the compound data structure is an array such that the compound object is a nested element of the array.

5. The method of claim 4, wherein multiple paths each define an element of the array that is of a different type such that the array is polymorphic.

6. The method of claim 1, wherein each of the at least one path, for which an element of the nested compound data structure is created, comprises a series of at least two names of elements.

7. The method of claim 1, wherein receiving developer input comprises receiving input of a visual design element to a visual design tool of the workflow framework.

8. The method of claim 1, wherein the compound data structure is a data structure of a type that is not a defined type in the workflow framework.

9. The method of claim 1, wherein the workflow framework is a continuation based runtime.

* * * * *